(12) United States Patent
Brossier et al.

(10) Patent No.: US 7,280,614 B2
(45) Date of Patent: Oct. 9, 2007

(54) SYNCHRONIZATION AND EQUALIZATION DEVICE FOR A DIGITAL TRANSMISSION SYSTEM RECEIVER

(75) Inventors: Jean-Marc Brossier, Saint Martin d'Hères (FR); Thierry Lenez, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 632 days.

(21) Appl. No.: 10/184,035

(22) Filed: Jun. 26, 2002

(65) Prior Publication Data

US 2003/0016764 A1 Jan. 23, 2003

(30) Foreign Application Priority Data

Jun. 29, 2001 (FR) .................................. 01 08694

(51) Int. Cl.
*H03K 9/00* (2006.01)
(52) U.S. Cl. ..................... 375/316; 375/232; 375/350
(58) Field of Classification Search ........ 375/229–232, 375/235, 324–326, 355, 346, 350
See application file for complete search history.

(56) References Cited

U.S. PATENT DOCUMENTS

| | | | |
|---|---|---|---|
| 4,805,191 A * | 2/1989 | Burch et al. ................ 375/229 |
| 5,018,166 A | 5/1991 | Tjahjadi et al. ............... 375/12 |
| 5,793,821 A * | 8/1998 | Norrell et al. .............. 375/355 |
| 6,067,319 A * | 5/2000 | Copeland ..................... 375/232 |
| 6,307,900 B1 * | 10/2001 | Choi ........................... 375/341 |
| 6,529,549 B1 * | 3/2003 | Norrell et al. .............. 375/229 |
| 6,985,549 B1 * | 1/2006 | Biracree et al. ............. 375/355 |

OTHER PUBLICATIONS

Abderrahman Essebbar et al., "An Algorithm for Blind Equalization and Synchronization," J. Franklin Inst. vol. 333(B), No. 3, pp. 339-347, 1996.

* cited by examiner

*Primary Examiner*—Khanh Tran
(74) *Attorney, Agent, or Firm*—Lisa K. Jorgenson; Dennis M. de Guzman; Seed IP Law Group PLLC

(57) ABSTRACT

A receiver for a digital data transmission device for receiving a digital signal and comprising a free sampler physically taking samples $r_k$ of a received signal r(t) at a frequency at least equal to twice the received signal spectrum maximum frequency. A digital interpolator allows to derive a sequence of samples $X_k$ calculated from said physical samples, according to a tuning parameter τ. An equalizer adjustable to a set of equalization parameters e allows to process said interpolator output samples $X_k$. A computing unit simultaneously provides, in a single processing, values of τ to the digital interpolator and values of the equalization parameters e to the digital equalizer. The invention also provides a method for digitally processing a received signal in a digital transmission device.

24 Claims, 4 Drawing Sheets

SYNCHRONIZATION AND EQUALIZATION DEVICE FOR A DIGITAL TRANSMISSION SYSTEM RECEIVER

BACKGROUND OF THE INVENTION

1. Field of the Invention

The present invention relates to the field of the digital transmissions of data and more particularly to a synchronization and equalization device for a receiver in a digital transmission system.

2. Description of the Related Art

Any person qualified in the art having to design a receiver for a digital transmission system, a receiver intended to receive either a signal in baseband or the output of a complex demodulator in the case of modulation-demodulation, will typically be confronted with two major problems which are symbol synchronization and equalization.

The first problem is that of symbol synchronization, which is also known as timing recovery (or also clock recovery in specialized literature). Symbol synchronization consists in allowing the receiver to extract from the baseband received signal—or even from the received signal's complex envelope in the case of modulation demodulation—the clock which was used on emission to insert the sequence of digital symbols a(k) carrying information. FIG. 1 shows traditional modeling of a digital communication chain in which are provided a transmitter modeled by a filter 11 associated by Fourier transform with an impulse response $g_{Te}(t)$ corresponding to shaping of the sequence of symbols a(k) at emission and to its transformation into a continuous waveform, a data communication channel 12 also associated by Fourier transform with an impulse response c(t) and which further adds some noise w(t). For the receiving part, are provided a sampler 13 controlled by a sampling clock with a $T_s$ period, a filter type equalizer 14 and a filter type equalizer control device 15. As can be seen, once locally rebuilt, the reception clock is used to control extraction of received signal r(t) samples at a rate (k×$T_S$), which must be synchronous with symbol times at transmission.

Many techniques exist for carrying out such symbol synchronization in order to obtain a reception clock which provides the optimum moments for the received signal sampling. However, all these techniques have a major defect, which results from their sensitivity to the data communication channel c(t). Indeed, the techniques which are usually employed are based on the assumption that the data communication channel's influence is negligible or—hardly better—that signals are correctly equalized. Even if it is generally possible to know the emission impulse response $g_{Te}(t)$ (represented by 11 in FIG. 1) with a certain precision and therefore to deduce a matched filter $g*_{Te}(-t)$ before sampling by element 13, the precise value of the data communication channel impulse response remains undetermined and undeterminable before sampling by sampler 13. FIG. 1 illustrates the classically recommended structure for a receiver which comprises such a preliminary processing before sampling of the reception signal. Matched filtering is applied by means of a filter 16 with an impulse response g*Te(−t) and which thus realizes processing adapted to the emission shaping. This filtering is then followed with synchronous sampling by sampler 13, then with optimal digital processing by means of digital filter 14. As can be seen, if the effect of emission shaping can thus be compensated, however the effect of the propagation medium cannot be taken into account nor dealt with, this effect tends to become increasingly important as this medium is submitted to higher and higher frequencies. With today's commonly used transmission rates, the effect of the physical environment of propagation can no longer be regarded as negligible so that the sampler 13 driving device is disturbed by the convolution effect resulting from the transfer function of the channel of propagation.

The second problem to which the designer of a reception system is confronted is equalization; i.e., taking into account the data communication channel which has already been described as having undetermined and variable responses. When transmission rates increase, symbol time duration becomes short relative to the length of the data communication channel impulse response. This means that, at each precise instant, the received signal by the receiver depends on several consecutive symbols. The effect of the channel tends to introduce a convolution between the various emitted symbols. Generally, the effect of the data communication channel is compensated for by carrying out equalization by means of a digital filter 14 which is introduced after the sampler, as can be seen in FIGS. 1 and 2. Parameters or internal coefficients of this digital equalization filter are adjusted so as to compensate as well as possible for the effect introduced by the transmission medium. In some known techniques, parameters are adjusted through a preliminary learning phase in which transmission-reception of a sequence of symbols known by the receiver are carried out, so that the receiver may correctly adjust its equalization parameters. In other techniques, adaptive digital algorithms are used which operate <<blindly>>, i.e., which do not use such a preliminary learning phase.

Classically, known equalization techniques, and the previously mentioned synchronization techniques, operate independently from one another. Clearly, the designer of a synchronization system usually starts from the postulate that the signal which is received and from which samples are to be synchronously taken at judiciously selected moments comes from a perfect or correctly equalized channel. On the other hand, any person willing to design an equalization device will start from a sampling operation supposed to be synchronous with emission, i.e., perfectly matching with emission symbol times, so as to ensure convergence of the adaptation process of his/her digital equalization filter.

As can be seen, the traditional approach has crippling limitations as it is not possible to perfectly solve any of these problems independently from the other. It is desirable to completely rethink the architecture of a transmission system receiver to commonly and simultaneously process correctly the received signal and, to consequently address the problem of symbol synchronization and the problem of channel equalization.

BRIEF SUMMARY OF THE INVENTION

An embodiment of the present invention provides a new architecture for a receiver in a digital transmission system, which makes it possible to solve jointly the problems of symbol synchronization and equalization with a single digital processing of the received signal, be it a baseband signal or a signal's complex envelope in the case of modulation followed by demodulation.

Another embodiment of the invention realizes a receiver for a digital communication system which makes it possible to carry out linked and blind synchronization and equalization with an entirely digital system.

Another embodiment of this invention provides a receiver architecture which is particularly simple to design and inexpensive to implement.

Another embodiment provides a receiver structure which comprises a free sampler operating at a speed equal to at least twice the nominal value of the symbol time and which is adapted to take physical samples from said received signal r(t) at instants $k \times T_s$, with no phase-relation with symbol times used at emission. An interpolator is used to determine, by digital calculation, new sample values $r_k$ of the signal at instants $k \times T_s + \tau_k$ different from the original sampled instants.

$$r_k = r(t)|t=kTs+\tau k$$

By proceeding to sufficiently fast sampling—i.e., at least twice the maximum value of the received signal frequency spectrum, it is possible to put processing of both symbol synchronization and equalization operations after sampling by the free sampler, thus allowing to simultaneously and jointly regulate the two problems.

Great simplification of the analog part of the receiver is thus achieved, since it is no longer necessary to design locked samplers controlled by accessory devices. Only a simple free sampler operating at a fixed frequency ($1/T_s$) is required. Realization of the receiver is thus considerably simplified and the manufacturing costs of the analog part are reduced. In particular, it is not even necessary to provide, before the sampler as is classically recommended, a filter carrying out adaptation to the shaping filter at emission.

Moreover, since a single unique digital processing will be carried out after the free sampler, it becomes possible to ensure symbol synchronization (by determining the tuning parameter $\tau_k$) and to ensure equalization (by determining coefficients of the filter type equalizer) with a single digital processing. Much better results are thus obtained on a practical level than with traditional approaches which consist in treating both problems separately.

In a preferred embodiment, a single criterion to minimize (or to maximize according to cases) allows to jointly carry out estimation of the parameter $\tau_k$ and convergence of the equalizer's parameters. This criterion is based on calculation of a cost function which could objectively be a distance between the equalizer complex output element and a constant radius circle, for example on the unit.

More especially, the following minimization of distance could be chosen:

$$J(\tau, e) = E((|Z_k(\tau, e)|^p - R_p)^m)$$

where $\tau$ is the tuning parameter of the interpolator, e is the vector composed of equalization parameters, E is the operator reporting the expected value, $R_p$ is a constant, $|Z_k|$ is the module of the complex vector output from the equalization filter and p and m are integer values, for instance p=m=2.

$$R_p = E(|a|^{2p})/E(|a|^p)$$

The invention also provides a method for processing a received signal in a digital communication device, the method comprising:

physically taking samples $r_k$ of the received signal r(t) at a frequency at least equal to twice the received signal maximum spectrum frequency;

through digital interpolation, deriving a sequence of samples $X_k$ calculated from said physical samples according to a tuning parameter $\tau$;

equalizing the $X_k$ samples according to a set of equalization parameters e;

optimizing the $\tau$ values for the digital interpolator and the e values of the equalization parameters for the digital equalizer in a same digital processing.

Preferably, optimal processing carries out minimization of a cost function $J(\tau, e)$ based on a characteristic of the modulation process which is used.

BRIEF DESCRIPTION OF THE SEVERAL VIEWS OF THE DRAWINGS

Non-limiting and non-exhaustive embodiments of the invention are illustrated by way of example in the following figures, wherein like reference numerals refer to like parts throughout the various views unless otherwise specified.

DETAILED DESCRIPTION OF THE INVENTION

Embodiments of a synchronization and equalization device for a digital system receiver are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 2:
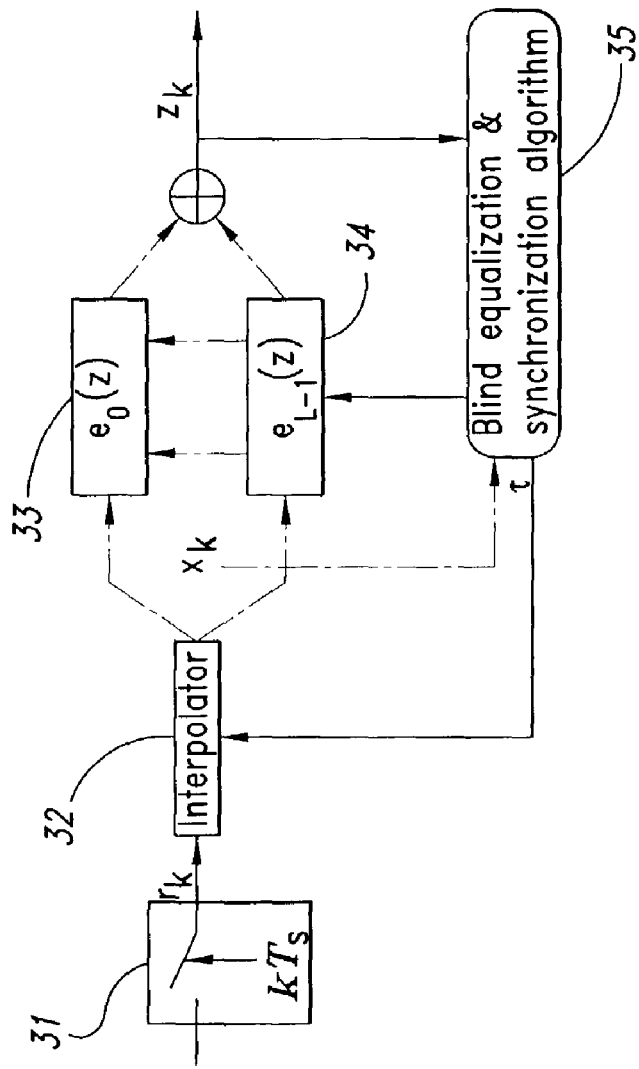
FIG. 2 illustrates an architecture of a preferred embodiment of the invention.

FIG. 2 more particularly illustrates a receiver according to a preferred embodiment. Generally, the structure of the receiver is applicable to any type of modulation if necessary as well as to any type of propagation medium. The case of a four-state phase modulation can be in nonrestrictively considered—or more generally a Phase Shift Key (P.S.K.) modulation—or a Quadrature Amplitude Modulation (Q.A.M.) type modulation. People qualified in the art will be able to easily adapt teachings of the invention according to the retained modulation and in particular for calculating of the objective cost function J which will be developed hereafter according to the particular modulation chosen. The receiver comprises a free sampler 31 which operates sampling of the received signal r(t) at a sufficiently high rate. Sampling frequency $1/T_s$ of sampler 31 is fixed to a value at least equal to twice the maximum frequency of the frequency spectrum of the expected signal r(t). In practice $T_s \cong T_e/2$ with $T_e$ equal to the symbol time could be taken. It is known that, according to the Shannon formula, by interpolation it is possible to reconstruct any sample of a finite spectrum signal by simply proceeding to sampling at a frequency equal to, at least, twice the value of the maximum frequency of the spectrum.

Such interpolation is carried out by means of an interpolator 32 which is concretely realized with a digital filter with a finite impulse response, which can be varied in time with a tuning factor τk. Designing such a filter will not be difficult for people qualified in the art and therefore, this particular filter structure will not be further developed. Simply note that this filter is designed so as to calculate new estimated values $r_k$ of the received signal r(t) at instants $k \times T_s + \tau_k$ from samples taken at the free rate $k \times T_s$. New sample values derived only by digital processing are thus obtained:

$$r_k = r(t)|t = KTs + \tau k$$

where $\tau_k$ is a tuning element for synchronization and is provided by control element 35 jointly ensuring control of the equalizer and of the synchronization process.

It will be pointed out that the Shannon interpolation formula, noted below, makes it possible to digitally derive these new values:

$$r(t) = \Sigma_k r(kT_s) sinc(\pi/T_s(t-kT_s))$$

where $T_s$ is the sampling frequency at the receiver, sinc is a cardinal sine operator. This interpolator 32 is carried out by means of a finite impulse response digital filter, this response varying with time. Control element 35 provides optimum sampling moments $t_k = kT_s + \tau_k$ to interpolator 32 which can then recalculate corresponding samples using the above given interpolation formula.

In some embodiments, it could be convenient to combine the above formula with linear interpolation formulas so as to allow for better use of the digital calculation resources used by the receiver.

If $T_e$ represents symbol time at transmission, the free sampler consequently carries out sampling at a frequency which, in a preferred embodiment, will be fixed to $2/T_e$ approximately. It should be noted that in this structure, contrary to the conventional structure of receivers, that sampling does not necessary need to be exactly synchronous with transmission symbol times. The nominal value of the sampling frequency must just be fixed to a sufficiently high value to ensure a sampling sufficient to allow for digital interpolation. A free sampler operating at his own nominal frequency can thus be realized, without taking into account with frequency shift of this sampler and of the transmission clock, as is classically the case. Generally, realization of a free sampler is known to people qualified in the art and will not be further developed. It must thus be noted that the analog part of the receiver can be substantially simplified, which substantially reduces realization costs of the receiver.

The receiver of this invention operates most of the processing, whether filtering adapted to transmission shaping or filtering adapted to the propagation medium (which could hardly be carried out according to traditional approach, as mentioned above), in a completely digital manner and benefits from digital processing computing flexibility and precision. By carrying out all of the synchronization and equalization processing before the free sampler, it is now possible to consider carrying out even the most sophisticated digital processing to simultaneously operate symbol synchronization and equalization since information received by the receiver is directly transformed into a digital form, sampled at a frequency twice the transmission clock frequency, and independently from the latter. All the most sophisticated processing are consequently realizable, with minimum error chances, and in particular, realization of a filter adapted to transmission shaping as well as to propagation medium.

Figure 1:
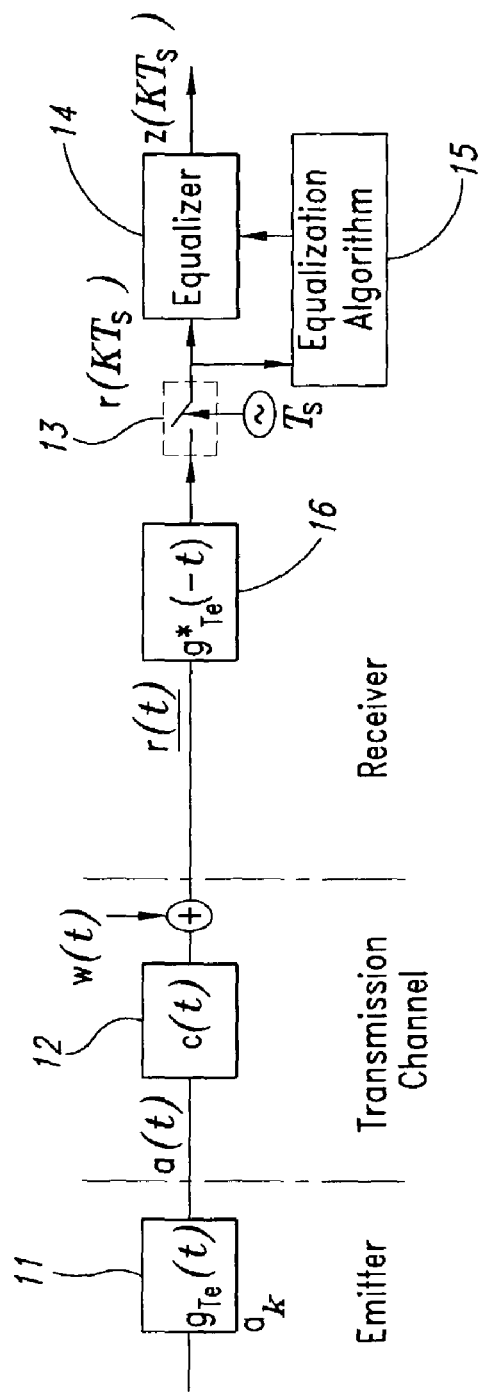
FIG. 1 illustrates a structure of a known receiver in which filtering is used to compensate for emission shaping before sampling. This filter can be a filter adapted to the shaping impulsion $g*_{Te}(-t)$ or more generally a low-pass filter which allows for sampling without loss of information.

In a preferred embodiment, this digital filtering is realized before the synchronous sampler by means of a double filter 33-34 realizing both elements of a split filter whose coefficients are controlled by control unit 35. The use of a split filter treating two or several samples per symbol time, though known of people qualified in the art, is however traditionally reserved for the conventional structure of a receiver, such as illustrated in FIG. 1, i.e., to carry out oversampling of samples which are supposed to be synchronous, as was previously mentioned. As it is known in the art, using a split filter allows to avoid using a recursive filter, the implementation of which is always delicate and, moreover, makes it possible to use a finite inverter filter which avoids truncation errors.

Figure 3:
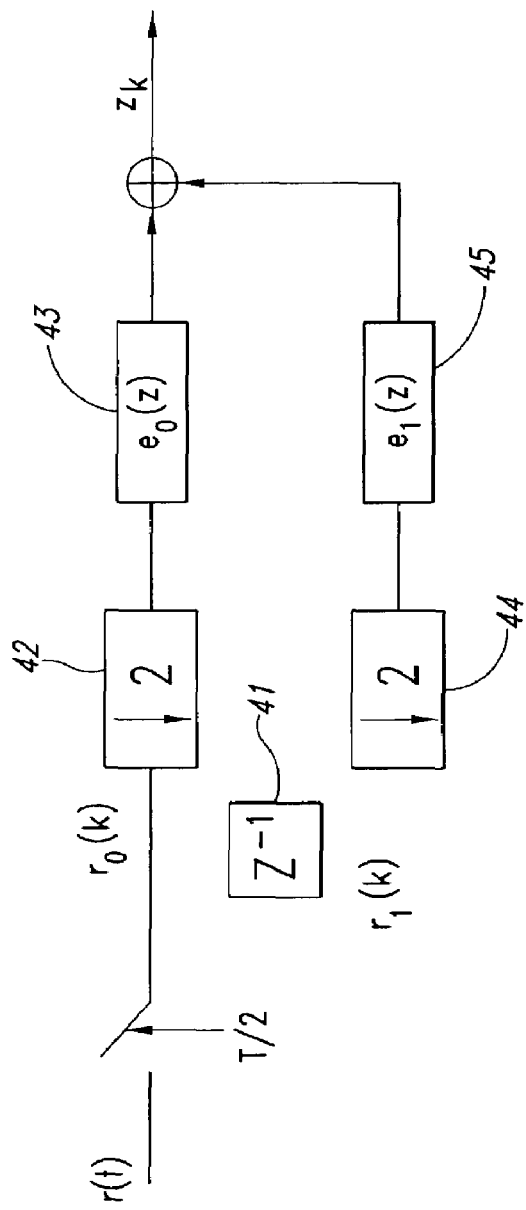
FIG. 3 illustrates a structure of a fractional filter type equalizer.

FIG. 3 shows the structure of a split filter adapted for processing two samples per symbol time. There is a delay element 41 and, for each branch, a sub-sampling element 42 (resp. 44) associated with a digital filter 43 (resp. 45). The first symbol time sample is thus processed by element 43 realizing filtering $e_0(z)$ while the second sample of time symbol is processed $e_1(z)$ by element 45. The outputs of filters 43 and 45 are then combined by means of an adder so as to produce the equalized output z(k).

It appears that the use of a split filter in the structure of a receiver as illustrated in FIG. 2 makes it possible to advantageously combine traditional advantages of split filters— i.e., to avoid using a recursive finite filter without truncation errors—with the immediate advantages from the invention, namely a nonsynchronous immediate digital processing of the received sampled signal at a frequency at least equal to $2/T_e$. The possibility to reconstitute, by digital interpolation, any desired sample and to process it by means of a nonrecursive filter having the advantages of a split filter is therefore provided. It becomes possible to realize synchronization and equalization of the received signal, in a perfectly blind and split way.

By means of a very simple system, a most efficient synchronization and blind equalization are thus obtained.

In a preferred embodiment, control element 35 sets value τ and values of the coefficients of both channels of the split filter by means of a single criterion, which thus makes it possible to simultaneously carry out symbol synchronization and blind equalization.

To this end, control element 35 uses a cost function that it tries to minimize. More particularly, the cost function uses a criterion which is characteristic of the modulation used. If one considers the case of the Modulation with Phase Shift Keying (P.S.K.), control element 35 calculates the distance between the module of vector $Z_K$ at the equalization filter output and a circle with a constant module.

The following formula can be advantageously used to calculate the objective cost function J:

$$J(\tau,e) = E((|Z_k(\tau,e)|^p - R_p)^m)$$

where τ is the interpolator's tuning parameter, e is the vector made up of equalization parameters, E is an operator for calculating the expected value, $|Z_k|$ is the module of the complex vector output from the equalization filter, $R_p$ is a constant and p and m are integers. In a preferred embodiment, p=m=2 can be set. R2 is a constant which depends on the modulation used and which can be set to the value:

$$R2 = E(|a|^4)/E(|a|^2)$$

It should be noted that objective function J mentioned above is only a nonrestrictive example of an objective function allowing, by minimization of a cost criterion, to carry out in a same processing synchronization and equalization of the received signal. Other cost functions can be employed, according to the particular modulation which is desired, and will be advantageous to refer to the known developments in the field blind of equalization, and in particular to article <<Self recovering equalization and carrier tracking in two dimensional data communication systems>>by D. GODARD in IEEE Trans. on Comm., vol. 28, No 11, pp. 1867-1875, November 1980. As can be seen, known techniques to carry out blind equalization can be directly implemented in the new structure for a receiver proposed herein to simultaneously realize symbol synchronization and equalization of a received signal.

To this end, it will be considered that cost function J depends both on synchronization parameter τ of and parameters of the split equalizer's vector e. Control element 35 of split equalizer 32-33 and interpolator 32 will then try to minimize this cost function by carrying out iterative tuning on simultaneous modification of τ values and coefficients of the split equalizer's L sub-filters $e_0(z)$, $e_1(z)$, $e_2(z)$ etc . . .

Figure 4:
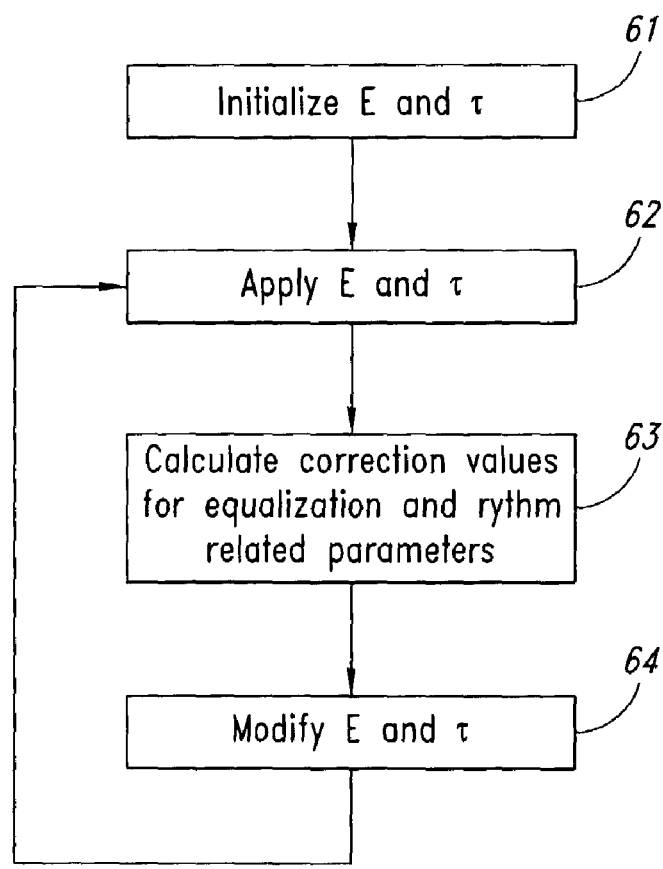
FIG. 4 shows a diagram of the equalizer tuning process.

FIG. 4 more particularly illustrates the iterative process to simultaneously modify values of τ and of the split equalizer's coefficients.

In a first step 61 values of τ and the values of the coefficients of the equalizer's L sub-filters $e=(e_0(z), e_1(z), e_2(z)) \ldots$ are initialized.

In step 62, the previously initialized values are applied to calculation of a first vector $X_0$ at the output of the interpolator 32 and of a first vector $Z_0$ at the output of the equalization filter.

In step 63, control unit 35 calculates corrections to the estimated values of τ and of vector e made up of the coefficients of the split equalizer's L sub-filters $e_0(z)$, $e_1(z)$, $e_2(z)$ etc. . . . in order to reduce the value of cost J.

In step 64, control unit 35 changes values of τ and values of the split equalizer's coefficients e. In a preferred embodiment, the following formulas will be used:

$$e_{k+1}=e_k-((|z_k|^2-R_2)z_k X^*_k$$

$$\tau_{k+1}=\tau_k-\mu(|z_k|^2-R_2)Re\{z^*_k \partial z_k/\partial \tau | e=e_k; \tau=\tau_k\}$$

where $X^*_k$ is vector $X_k$ complex conjugate vector;

Re( ) is the operator referring to a complex number's real part;

partial derivative $\partial z_k/\partial \tau =: e^T_k \partial X_k/\partial \tau + \partial e^T_k/\partial \tau X_k$ and γ and μ and (are parameters setting the adjustment step of the iterative process. In a preferred embodiment these adjustment parameters could both be adaptive parameters.

Preferably, digital calculation of discrete derivatives can be used to estimate the above mentioned partial derivatives. For example, partial derivatives can be approached by the following finite differences:

$$\partial X_k/\partial \tau = 2(X_k^{(1)}-X_k^{(0)})$$

$$\partial e_k/\partial \tau = 2(e_k^{(1)}-e_k^{(0)})$$

where $X_k^{(1)}$ is composed of odd elements of $X_k$, $X_k^{(0)}$ is composed of even elements of $X_k$, $e_k^{(1)}$ of odd elements of $e_k$ and $e_k^{(0)}$ of even elements of $e_k$.

Once formulas have been recalculated, the process then loops back to step 62 to apply these new values to operation of the interpolator and the equalizer.

Successive and simultaneous tuning of symbol synchronization is thus obtained—by convergence of the parameter $\tau_k$—together with that of the parameters of the equalizer.

A new architecture is thus provided which allows, on the one hand, to considerably reduce the analog part of the receiver in a digital transmission system and, on the other hand, to carry out total and particularly powerful processing of synchronization and equalization by means of a single criterion. Once sampled by the free sampler at a frequency compatible with the Shannon criterion, all digital processing, up to the most sophisticated ones, become possible thus making it possible to benefit from known processor power.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A system, comprising:
    a transmission device to transmit a signal; and
    a receiver device to receive the signal transmitted by the transmission device, the receiver device including:
    a sampler to obtain samples from the received signal at a frequency at least equal to twice a maximum frequency of a frequency spectrum of the received signal;
    an interpolator coupled to the sampler to derive a sequence of samples from the obtained samples according to a tuning parameter;
    an equalizer coupled to the interpolator to equalize the samples from the interpolator based on at least one equalization parameter; and
    a control element coupled to the interpolator and to the equalizer to provide the tuning parameter and the equalization parameter, respectively, in a single digital process, wherein the equalizer includes:
    a first digital filter to process a first sample from the interlator based on a first equalization parameter provided by the control element; and
    at least a second digital filter to process a second sample from the interpolator based on a second equalization parameter provided by the control element, wherein the control element is capable to use minimization of a cost function to simultaneously set the tuning parameter and the first and second equalization parameters.

2. The system of claim 1, wherein the control element is capable to modify the tuning parameter and the first and second equalization parameters in an iterative process based on outputs of the digital filters, the control element being coupled to provide the modified tuning parameter and the modified first and second equalization parameters to the interpolator and to the first and second digital filters, respectively, to obtain new outputs from the digital filters.

3. A method, comprising:
sampling a received signal, at a frequency at least equal to twice a maximum frequency of a frequency spectrum of the received signal, to obtain samples:
applying digital interpolation to the samples to derive a sequence of samples according to a tuning parameter for synchronization;
equalizing the samples in the sequence based on at list one equalization parameter; and
optimizing the tuning parameter for synchronization and the equalization parameter for equalization in a single processing, wherein optimizing the tuning paramter for synchronization and the eq ualization paramter for equalization includes minimizing a cost function based on a characteristic of a modulation of the received signal, wherein equalizing the samples in ht e sequence includes;
processing a first sample from the sequence based on a first equalization parameter; and
processing a second sample from the sequence based on a second equalization parameter.

4. The method of claim 3, wherein optimizing the tuning parameter and the equalization parameter comprises iteratively modifying the tuning parameter and the first and second equalization parameters based on the processed first and second samples until convergence, the method further comprising applying the modified parameters to the interpolation and to the equalization, respectively, to obtain new outputs.

5. The method of claim 3, further comprising combining the processed first and second samples to obtain an equalized output.

6. An apparatus, comprising:
a sampler to obtain samples from a received signal at a frequency at least eciual to twice a maximum frequency of a frequency spectrumn of the received signal;
an interpolator coupled to the sampler to derive a sequence of samples from the obtained samples according to a tuning parameter for synchronization;
an equalizer coupled to the interpolator to equalize the samples from the interpolator based on at least one equalization parameter; and
a control element coupled to the interpolator and to the equalizer to provide the tuning parameter for synchronization and the equalization parameter for equalization, respectively, in a single digital process, wherein the control element is capable to use minimization of a cost function to simultaneously set the tuning parameter for synchronization and the equalization parameter for equalization,
wherein the equalizer is coupled to equalize the samples of the sequence from the interpolator by processing a first sample from the sequence based on a first equalization parameter, and by processing a second sample from the sequence based on a second equalization parameter.

7. The apparatus of claim 6 wherein the sampler comprises a free sampler fixed to the frequency at least equal to twice the maximum frequency of the frequency spectrum of the received signal.

8. The apparatus of claim 6 wherein the interpolator compriscs a digital filter having a finite impulse response that can be varied according to the tuning parameter.

9. The apparatus of claim 6 wherein the equalizer comprises a split filter having coefficients controlled by the control element.

10. The apparatus of claim 9 wherein the split filter comprises:
a first digital filter to process said first sample from the interpolator based on said first equalization parameter provided by the control element; and
at least a second digital filter to process said second sample from the interpolator based on said second equalization parameter provided by the control element.

11. The apparatus of claim 10, comprising an adder coupled to the digital filters to combine their outputs to produce an equalized output.

12. The apparatus of claim 6, wherein minimization of the cost function by the control element is based on a characteristic of a modulation of the received signal.

13. A method for processing signals in a digital transmission device, the method comprising;
taking samples $r_k$ from a received signal r(t) at a frequency at least equal to twice the received signal spectrum maximum frequency, using a free sampler;
deriving, by digital interpolation, a sequence of samples $X_k$ calculated from said samples, according to a tuning parameter τ for synchronization;
equalizing said samples $X_k$ to a set of equalization parameters e; and
in a single digital processing, optimizing values of said τ for synchronization for the digital interpolation and values of the equalization parameters e for the digital equalization, wherein said optimizing processing includes minimizing a cost function J(τ,e) based on a characteristic of a modulation process used, wherein equalizing said samples $X_k$ of the sequence to the set of equalization parameters e includes:
processing a first sample from the sequence based on a first equalization parameter; and
processing a second sample from the sequence based on a second equalization parameter.

14. A method according to claim 13 wherein said optimizing processing includes:
iteratively modifying values of τ and e; and
applying the modified values of τ and e to the interpolation and equalization, respectively.

15. A receiver for a digital transmission device to receive a digital signal, the receiver comprising;
a free sampler to physically take samples $r_k$ from the received signal r(t) at a frequency at least equal to twice the received signal spectrum maximum frequency;
a digital interpolator to derive a sequence of samples $X_k$ calculated from said physical samples, according to a tuning parameter τ for synchronization;
an equalizer to process said samples $X_k$ from said interpolator, said equalizer being adjustable to a set of equalization parameters e; and
a control unit to simultaneously provide, in a single processing, values of said τ for synchronization to the digital interpolator and values of the equalization parameters e to the equalizer, wherein said control unit minimizes a cost function J(τ,e) based on a characteristic of a modulation process used,
wherein the equalizer is coupled to equalize the samples of the sequence from the interpolator by processing a first sample from the sequence based on a first equalization parameter, and by processing a second sample from the sequence based on a second equalization parameter.

16. A receiver according to claim 15 wherein the modulation used is a phase shift key modulation or a quadrature amplitude modulation (Q.A.M.) and in that the cost function represents a distance between equalizer output vector $X_k$ and a circle with a constant radius.

17. A receiver according to claim 16 wherein the cost function is calculated as follows:

$$I(\tau,\underline{c}) = E((|Z_k(\tau,\underline{c})|^p - R_p)^m)$$

where $\tau$ is the interpolator tuning parameter for synchronization, $\underline{c}$ is the set of equalization parameters, E is an operator to calculate an expected value, $|Z_k|$ is a module of a complex vector output from the equalizer, $R_p$ is a constant and p and m are integers.

18. A receiver according to claim 17 wherein the equalizer comprises a split equalizer using two sets of coefficients provided by said control unit.

19. A receiver according to claim 18 herein the equalization parameters and the $\tau$ parameter for synchronization are calculated as follows:

$$\underline{c}_{k+1} = \underline{c}_k - ((|z_k|^2 - R_2)) z_k \underline{X}^*_k$$

$$\tau_{k+1} = \tau_k - \mu(|z_k|^2 - R_2) Re\{z^*_k \partial z_k / \partial \tau |\underline{c} = \underline{c}_k; \tau = \tau_k$$

where $\underline{X}^*_k$ is vector $\underline{X}_k$ complex conjugate vector;
Re() is an operator referring to a complex number's real part;
partial derivative $\partial z_k / \partial \tau = \underline{e}^T_k / \partial \tau + \partial \underline{e}^T_k / \partial \tau \underline{X}_k$
and $\mu$ and $\gamma$ are parameters to set an adjustment of process.

20. A receiver according to claim 19 wherein parameters $\gamma$ and $\mu$ are both adaptive parameters.

21. A digital transmission device having a receiver as claimed in claim 15.

22. A system, comprising:
means for sampling a received signal, at a frequency at least equal to twice a maximum frequency of a frequency spectrum of the received signal, to obtain samples;
means for applying digital interpolation to the samples to derive a sequence of samples according to a tuning parameter for synchronization;
means for equalizing the samples in the sequence based on at least one equalization parameter; and
means for optimizing the tuning parameter for synchronization and the equalization parameter for equalization in a single processing, wherein said means for optimizing the tuning parameter for synchronization and the equalization parameter for equalization includes means for minimizing a cost function based on a characteristic of a modulation of the received signal, and wherein said means for equalizing the samples in the sequence includes:
means for processing a first sample from the sequence based on a first equalization parameter, and
means for processing a second sample from the sequence based on a second equalization parameter.

23. The system of claim 22 wherein said means for processing the first and second samples includes at least one digital filter.

24. The system of claim 22 further comprising means for combining the processed first and second samples to obtain an equalized output.

* * * * *

UNITED STATES PATENT AND TRADEMARK OFFICE
CERTIFICATE OF CORRECTION

PATENT NO. : 7,280,614 B2
APPLICATION NO. : 10/184035
DATED : October 9, 2007
INVENTOR(S) : Brossier et al.

It is certified that error appears in the above-identified patent and that said Letters Patent is hereby corrected as shown below:

Column 8
Line 54, "interlator" should read as -- interpolator --

Column 9
Line 15, "the eq ualization" should read as -- the equalization --
Line 18, "ht e" should read as -- the --
Line 38, "eciual" should read as -- equal --
Line 39, "spectrumn" should read as -- spectrum --
Line 66, "compriscs" should read as -- comprises --

Column 10
line 13, "The apparatus of claim 10, comprising an adder..." should read as -- The apparatus of claim 10, further comprising an adder...--

Column 11
Line 11, "$|(\tau, \underline{e}) = E( (| Z_k(\tau, \underline{e}) |^P - R_p )^m )$" should read as
-- $J(\tau, \underline{e}) = E( (| Z_k(\tau, \underline{e}) |^P - R_p )^m )$ --
Line 21, "herein" should read as -- wherein --
Line 31, "$\partial z_k/\partial\tau = \underline{e}^T_k/\partial\tau + \partial\underline{e}^T_k/\partial\tau\underline{X}_k$" should read as
-- $\partial z_k/\partial\tau = \underline{e}^T_k\ \partial\underline{X}_k/\partial\tau + \partial\underline{e}^T_k/\partial\tau\underline{X}_k$ --.
Line 34, the "$|\gamma$" should read as -- $\gamma$ --.

Signed and Sealed this

First Day of July, 2008

JON W. DUDAS
*Director of the United States Patent and Trademark Office*